US010097286B2

(12) United States Patent
Long et al.

(10) Patent No.: US 10,097,286 B2
(45) Date of Patent: Oct. 9, 2018

(54) DATA TRANSMISSION OVER A REDUCED NUMBER OF PHYSICAL ANTENNAS

(71) Applicant: Telefonaktiebolaget LM Ericsson (publ), Stockholm (SE)

(72) Inventors: Jianguo Long, Kanata (CA); Girum Fantaye, Ottawa (CA); Bo Göransson, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 48 days.

(21) Appl. No.: 15/112,227

(22) PCT Filed: Feb. 19, 2014

(86) PCT No.: PCT/SE2014/050202
§ 371 (c)(1),
(2) Date: Jul. 18, 2016

(87) PCT Pub. No.: WO2015/126289
PCT Pub. Date: Aug. 27, 2015

(65) Prior Publication Data
US 2016/0337054 A1    Nov. 17, 2016

(51) Int. Cl.
*H04B 17/17*    (2015.01)
*H04B 7/06*    (2006.01)
(Continued)

(52) U.S. Cl.
CPC .......... *H04B 17/17* (2015.01); *H04B 7/0689* (2013.01); *H04L 1/1893* (2013.01);
(Continued)

(58) Field of Classification Search
CPC . H04B 17/17; H04B 7/02; H04B 7/04; H04B 7/0456; H04B 7/06; H04B 7/0608;
(Continued)

(56) References Cited

U.S. PATENT DOCUMENTS

| 7,894,544 B2 * | 2/2011 | Bang | H04L 1/0668 375/267 |
| 8,462,870 B2 * | 6/2013 | Wu | H04B 7/0413 375/267 |

(Continued)

FOREIGN PATENT DOCUMENTS

| EP | 2053772 A1 | 4/2009 |
| WO | 2011105938 A1 | 9/2011 |

(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Physical Channels and Modulation (Release 8)", 3GPP TS 36.211 V8.7.0, Technical Specification, 3GPP TS 36.211 V8.7.0, May 1, 2009, pp. 1-83, 3GPP, France.

(Continued)

*Primary Examiner* — Jeffrey M Rutkowski
*Assistant Examiner* — Jonathan B Wood
(74) *Attorney, Agent, or Firm* — Coats & Bennett, PLLC

(57) ABSTRACT

The disclosure relates to a method, performed in a multi-antenna radio access node comprising four logical antenna ports mapped to corresponding physical antennas, of transmitting data using three physical antennas. The method comprises determining (S51) loss of data transmission from one physical antenna of the four physical antennas. A required multi-antenna transmission scheme is determined (S52). An antenna mapping matrix prestored in the radio access node is selected (S53), the selected antenna mapping matrix adapted to the required multi-antenna transmission scheme. Data on the four logical antenna ports are re-mapped (S54) to the remaining three physical antennas by using the selected antenna mapping matrix, whereupon the (Continued)

data is transmitted (S55) from the remaining three physical antennas.

15 Claims, 5 Drawing Sheets

(51) Int. Cl.
  *H04L 5/00* (2006.01)
  *H04L 1/18* (2006.01)
  *H04W 52/42* (2009.01)
(52) U.S. Cl.
  CPC .......... *H04L 1/1896* (2013.01); *H04L 5/0048* (2013.01); *H04W 52/42* (2013.01)
(58) Field of Classification Search
  CPC .. H04B 7/0689; H04B 7/0691; H04B 7/0802; H04B 7/0817; H04B 1/005; H04W 52/42; H04L 1/18; H04L 1/1893; H04L 1/1896; H04L 5/00; H04L 5/0048
  See application file for complete search history.

(56) References Cited

U.S. PATENT DOCUMENTS

| | | | |
|---|---|---|---|
| 9,288,698 B2 * | 3/2016 | Davydov | H04W 24/08 |
| 9,407,409 B2 * | 8/2016 | Bhattad | H04L 1/0606 |
| 9,496,986 B2 * | 11/2016 | Roh | H04L 1/0003 |
| 9,872,242 B2 * | 1/2018 | Xiao | H04W 48/20 |
| 2005/0003863 A1 * | 1/2005 | Gorokhov | H04B 7/0691 |
| | | | 455/562.1 |
| 2005/0148306 A1 * | 7/2005 | Hiddink | H04B 7/0608 |
| | | | 455/101 |
| 2005/0185734 A1 * | 8/2005 | Hottinen | H04L 1/0643 |
| | | | 375/295 |
| 2007/0253501 A1 * | 11/2007 | Yamaura | H04B 7/0417 |
| | | | 375/262 |
| 2007/0253507 A1 * | 11/2007 | Zhou | H04L 1/0001 |
| | | | 375/267 |
| 2008/0139153 A1 * | 6/2008 | Tuo | H04B 7/0695 |
| | | | 455/277.2 |
| 2008/0248753 A1 * | 10/2008 | Chang | H04B 7/0417 |
| | | | 455/63.1 |
| 2008/0267056 A1 | 10/2008 | Aryanfar et al. | |
| 2009/0285325 A1 * | 11/2009 | Zhou | H04B 7/0854 |
| | | | 375/267 |
| 2010/0297962 A1 | 11/2010 | Rofougaran | |
| 2010/0322343 A1 * | 12/2010 | Yeon | H04B 7/0447 |
| | | | 375/295 |
| 2011/0077059 A1 * | 3/2011 | Kim | H04W 52/0274 |
| | | | 455/574 |
| 2011/0171930 A1 | 7/2011 | Yoon | |
| 2011/0195741 A1 * | 8/2011 | Kim | H04B 7/0689 |
| | | | 455/522 |
| 2011/0223876 A1 | 9/2011 | Kang | |
| 2011/0312353 A1 * | 12/2011 | Banister | H04B 7/0691 |
| | | | 455/500 |
| 2012/0213056 A1 * | 8/2012 | Aldana | H04B 7/0413 |
| | | | 370/216 |
| 2013/0223392 A1 * | 8/2013 | Seo | H04L 1/0026 |
| | | | 370/329 |
| 2013/0272257 A1 * | 10/2013 | Takaoka | H04W 52/42 |
| | | | 370/329 |
| 2014/0093012 A1 | 4/2014 | Zhang et al. | |
| 2014/0119225 A1 * | 5/2014 | Hasegawa | H04B 7/0413 |
| | | | 370/252 |
| 2014/0140435 A1 * | 5/2014 | Zhang | H04B 7/0617 |
| | | | 375/295 |
| 2015/0215023 A1 * | 7/2015 | Thurfjell | H04B 7/046 |
| | | | 375/295 |
| 2015/0312866 A1 * | 10/2015 | Kakishima | H04W 52/146 |
| | | | 370/328 |
| 2016/0233936 A1 * | 8/2016 | Shim | H04B 7/0478 |

FOREIGN PATENT DOCUMENTS

| | | |
|---|---|---|
| WO | 2011157107 A2 | 12/2011 |
| WO | 2012053948 A1 | 4/2012 |
| WO | 2013119159 A1 | 8/2013 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer—Measurements (Release 8)", Technical Specification, 3GPP TS 36.214 V8.7.0, Sep. 1, 2009, pp. 1-12, 3GPP, France.

Feng, S., "Self-Organizing Networks (SON) in 3GPP Long Term Evolution," Nomor Research GmbH, Munich, Germany, May 20, 2008, pp. 1-15.

Huawei, "Discussion on the definition of eight antenna ports in DL LTE-A," 3GPP TSG RAN WG1#56bis, Agenda Item: 15.1, R1-091262, Seoul, Korea, Mar. 23, 2009, pp. 1-5.

* cited by examiner

DATA TRANSMISSION OVER A REDUCED NUMBER OF PHYSICAL ANTENNAS

TECHNICAL FIELD

The present disclosure relates to methods, performed in a multi-antenna radio access node comprising four logical antenna ports mapped to physical antennas, of transmitting data using a reduced number of physical antennas.

The disclosure also relates to a multi-antenna radio access node configured to perform the methods.

BACKGROUND

A Long Term Evolution, LTE, radio access network, RAN, uses a flat architecture with a single type of LTE radio base station, also denoted radio access node, eNB, eNodeB, or evolved NodeB. The radio base station is responsible for all radio related functions in one or several cells. LTE supports downlink transmission using a multi-antenna configuration. The multi-antenna configuration is used in LTE to support different transmission modes, TMs, for example transmit diversity and spatial multiplexing or multiple-input multiple-output, MIMO.

TM1 is a single antenna transmission mode, where only a single antenna is used.

TM2 is a transmit diversity mode. Operation according to TM2 amounts to sending the same information via different antennas. This improves the signal-to-noise ratio, SNR, and thus makes transmission more robust.

TM3 is also referred to as open loop spatial multiplexing, OLSM. This MIMO mode supports spatial multiplexing of up to two or up to four layers which are multiplexed onto two to four antennas, respectively. TM3 is used in order to achieve higher data rates. Due to the open loop property, TM3 does not require very much interaction with, i.e., feedback from, the user equipment, UE.

TM 4 is also referred to as closed loop spatial multiplexing, CLSM. Similar to TM3, this MIMO mode also supports spatial multiplexing of up to two or up to four layers which are multiplexed onto two to four antennas, respectively. This mode also achieves higher data rates compared to, e.g., TM2 or TM1. The closed loop property refers to that the UE continuously sends feedback regarding the channel situation, which, e.g., includes information about the preferred type of precoding.

In case of multi-antenna transmission in LTE downlink up to four cell specific logical antenna ports are defined, wherein each logical antenna port is mapped to one or more power amplifiers and physical antennas in the eNodeB. The LTE system considered in the present disclosure is configured with four logical antenna ports.

Traditionally, when one physical antenna fails, elements of a physical antenna branch fails or functions poorly, e.g. the a situatione with a bad antenna, failure of a power amplifier or broken filter, in a four-antenna eNodeB, the system either continues to work with the three remaining physical antennas while still maintaining a four antenna precoding scheme, i.e., continues as if nothing has happened. Alternatively, conventional LTE antenna fault handling methods are used, whereby a two antenna configuration replaces the previous four antenna configuration, since the LTE only allows one, two, or four antenna configurations.

Both of the above suggested approaches provide working solutions for handling a situation with one faulty antenna. However, both approaches result in significant draw-backs with regard to utilization of the system capacity and resources. For instance, in the case where transmission is continued over three physical antennas as if nothing has happened, a transmit diversity scheme will lose one diversity or main branch signal. For the cases where a two port configuration is selected, a fully functional physical antenna element is disconnected. Consequently, a failure of one physical antenna element results in loss of one additional physical antenna element, i.e., a sub-optimal use of transmit power capacity and a reduction in the ability for spatial diversity in the antenna system.

SUMMARY

It is an object of the present disclosure to overcome some of the disadvantages experienced when one out of four physical antennas is disconnected, either as a result of a failure in the physical antenna branch or as a result of a voluntary disconnection.

The object of the disclosure is achieved by a method performed in a radio access node of a wireless communications network, the radio access node being configured for downlink transmission on four logical antenna ports.

This object is achieved by a method, performed in a multi-antenna radio access node comprising four logical antenna ports mapped to corresponding physical antennas, of transmitting data using three physical antennas. The method comprises determining loss of data transmission from one physical antenna of the four physical antennas. A required multi-antenna transmission scheme is determined. An antenna mapping matrix prestored in the radio access node is selected, the selected antenna mapping matrix adapted to the required multi-antenna transmission scheme. Data on the four logical antenna ports are re-mapped to the remaining three physical antennas by using the selected antenna mapping matrix, whereupon the data is transmitted from the remaining three physical antennas.

The disclosed method of transmitting data re-mapped to three physical antennas provides the benefit of using the systems full capacity even when the system capacity is reduced due to the loss of data transmission from one antenna. With the disclosed method, the system will benefit from improved performance as compared to previous ways of handling transmission over a reduced number of antennas and given the fault circumstances.

In accordance with an aspect of the disclosure, the loss of data transmission from one physical antenna results from an antenna failure.

The disclosed method provides the advantage of providing a fallback position for the situation where one physical antenna fails, regardless of which antenna that suffers from the failure.

In accordance with an aspect of the disclosure, the re-mapping is performed in the baseband/logical interface of the multi-antenna radio access node.

In accordance with an aspect of the disclosure, the re-mapping is performed in the radio/physical interface of the multi-antenna radio access node.

The disclosed method provides the advantage of being equally applicable in the baseband and the radio.

In accordance with an aspect of the disclosure, the method further includes transmitting a set of reference signals, each reference signal representing a respective antenna port of the four logical antenna ports, on the remaining three physical antennas. Transmission power is scaled for each physical antenna based on the number of reference signals transmitted on the respective physical antenna.

In accordance with an aspect, the transmission power is reduced by half, when two reference signals are transmitted from one physical antenna.

In accordance with an aspect of the disclosure the transmission power of a physical antenna is scaled by a power scaling factor corresponding to the number of reference signals transmitted on the physical antenna.

In accordance with an aspect of the disclosure, re-mapping of the at least four logical antenna ports to a remaining three physical antennas comprises the use of a precoding matrix including the power scaling factor.

The scaling of the transmission power provides the advantage that transmission powers of remaining antenna branches are left unaffected by the re-mapping of the at least four logical antenna ports to a remaining three physical antennas.

In accordance with an aspect of the disclosure, the re-mapping implies re-mapping of a first logical antenna port to a first physical antenna, a second logical antenna port to a second physical antenna and a third and fourth logical antenna port to a third physical antenna, wherein the first and second physical antennas are co-polarized antennas and the third physical antenna element has an orthogonal polarization to the first and second physical antennas.

In accordance with an aspect of the disclosure, determination of the required multi-antenna transmission scheme comprises determining one or more types of antenna transmission schemes used in current transmission and selecting a re-mapping matrix from a group of prestored re-mapping matrices based on current antenna transmission scheme, each re-mapping matrix representing a re-mapping adapted to a specified antenna transmission scheme.

In accordance with an aspect of the disclosure, the method further comprises using an antenna transmission scheme with a transmit diversity scheme for the PBCH, Physical Broadcast Channel; PCFICH, Physical Control Format Indicator Channel; PDCCH, Physical Downlink Control Channel; PHICH, Physical Hybrid ARQ Indicator Channel; and/or PDSCH, Physical Downlink Shared Channel: In the transmit diversity scheme, a first and second physical antenna represent main branches and a third physical antenna represents a diversity branch. The power of transmissions on the third physical antenna element is scaled by a power scaling factor.

In accordance with an aspect of the disclosure, the power scaling factor is selected to align transmission power on the diversity branch to transmission power on the main branches.

The transmit diversity scheme provided is thus a four-antenna and two-antenna hybrid transmit diversity scheme offering improved transmit power capacity compared to a common two-antenna transmit diversity scheme.

The disclosure also relates to a multi-antenna radio access node in a wireless network. The radio access node comprises four logical antenna ports and four physical antennas. The disclosed multi-antenna radio access node is configured for enabling downlink data transmission over a reduced number of physical antennas. The multi-antenna radio access node further comprises a radio communications interface connecting to the four physical antennas. A processor of the multi-antenna radio access node comprises the four logical antenna ports and is configured to determine loss of data transmission from one physical antenna of the four physical antennas and to determine required multi-antenna transmission scheme. The processor is further configured to select an antenna mapping matrix prestored in a memory in the radio access node, the selected antenna mapping matrix adapted to the required multi-antenna transmission scheme. The processor is configured to control the re-mapping of data on the four logical antenna ports to remaining three physical antennas by using the selected antenna mapping matrix and to initiate transmission of data from the remaining three physical antennas over the radio communication interface.

In accordance with an aspect of the disclosure, the multi-antenna radio access node further includes a physical antenna failure determination entity.

In accordance with an aspect of the disclosure, the processor is configured to execute the re-mapping.

In accordance with another aspect of the disclosure, the radio communications interface is configured to execute the re-mapping.

The disclosure also relates to a computer program, comprising computer readable code which, when run in a multi-antenna radio access node causes the access node to perform the disclosed method.

The access node and computer program each display advantages corresponding to the advantages already described in relation to the method performed in the access node.

BRIEF DESCRIPTION OF THE DRAWINGS

The present technique will be more readily understood through the study of the following detailed description of the embodiments/aspects together with the accompanying drawings, of which.

DETAILED DESCRIPTION

Figure 1:
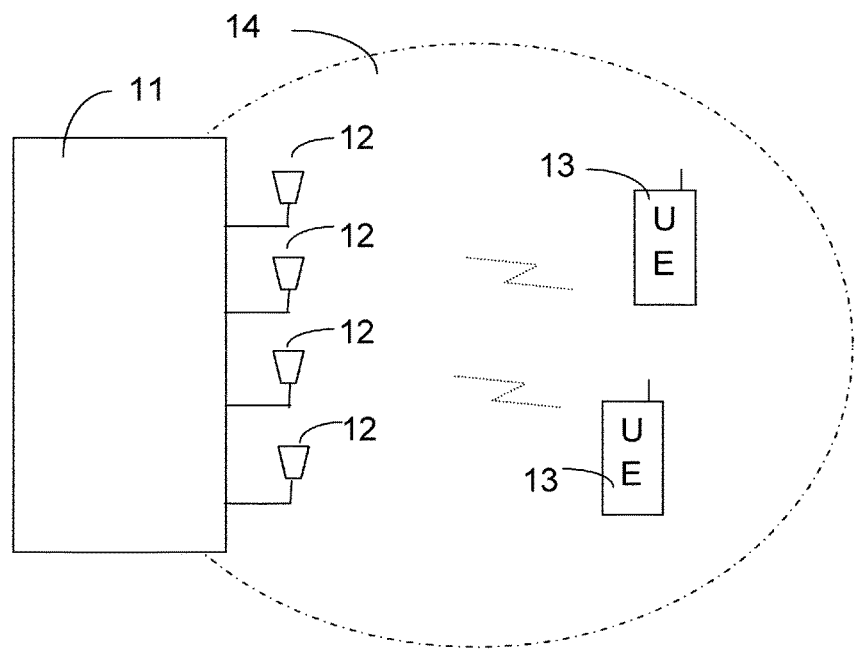
FIG. 1 is a schematic overview of a multi-antenna radio access node and associated cell FIG. 2
a. illustrates an antenna setup
b. Illustrates an antenna setup after loss of one antenna FIG. 3
a. Illustrates a resource mapping used in a four antenna transmit diversity scheme
b. Illustrates a resource mapping after fall back to a configuration with three physical antennas FIG. 4
a. Is a schematic view of an embodiment of a multi-antenna radio access node
b. Is a schematic view of another embodiment of a multi-antenna radio access node.

Aspects of the present disclosure will be described more fully hereinafter with reference to the accompanying drawings. The methods and wireless device disclosed herein can, however, be realized in many different forms and should not be construed as being limited to the aspects set forth herein. Like numbers in the drawings refer to like elements throughout.

The general object or idea of embodiments of the present disclosure is to address at least one or some of the disadvantages with the prior art solutions described above as well as below. The various steps described below in connection with the figures should be primarily understood in a logical sense, while each step may involve the communication of one or more specific messages depending on the implementation and protocols used.

The terminology used herein is for the purpose of describing particular aspects of the disclosure only, and is not intended to limit the disclosure to any particular embodiment. As used herein, the singular forms "a", an and the are intended to include the plural forms as well, unless the context clearly indicates otherwise.

It is an object of the present disclosure to overcome some of the disadvantages experienced when one out of four physical antennas is disconnected, either as a result of a failure or as a result of a voluntary disconnection.

FIG. 1 schematically illustrates a cell 14 in a cellular communications network. The network comprises a multi-antenna radio access node 11 having four logical antenna ports for downlink transmission, not shown in FIG. 1, and four physical antennas 12. The multi-antenna radio access node is arranged to communicate with user equipment, UE, 13.

Each of the four logical antenna ports of the multi-antenna radio access node 11 is connected to at least one of the physical antennas 12. Thus, a logical antenna port can be connected to a single antenna, in which case signals transmitted on the logical antenna port results in transmission from a single antenna, or a logical antenna port can be connected to more than one physical antenna, in which case signals transmitted on the logical antenna port results in transmission from more than one antenna.

In the case a single physical antenna is associated with more than one logical antenna port a scaling of transmitted signal power is preferred. The purpose of such a scaling is to maintain a constant transmission power from each of the physical antennas despite the number of antenna ports associated to each physical antenna. Also, according to some aspects, it is preferred to maintain the relative power between LTE cell-specific reference symbols and PDSCH symbols, which is accomplished by an appropriate scaling factor.

The relationship or association between logical antenna ports and physical antennas is herein referred to as a mapping. A change of this mapping between logical antenna ports and physical antennas is herein referred to as a re-mapping. A mapping is conveniently represented by a mapping matrix, sometimes also referred to herein as a precoding matrix. This matrix, in general, multiplies an input vector corresponding to the complex symbols transmitted on the logical antenna ports, and generates complex output vectors corresponding to the complex valued signals transmitted via the different physical antennas. Examples of mapping matrices will be given below in connection to a discussion on re-mapping according to the present teaching.

As disclosed herein, when a physical antenna fails, or is somehow disconnected from the system, a re-mapping can be performed in order to change the relationship between logical antenna ports and physical antennas, the main purpose being to adjust the mapping between logical antenna ports and physical antennas to better suit the new scenario with a fewer number of operational antennas.

Figure 2A:
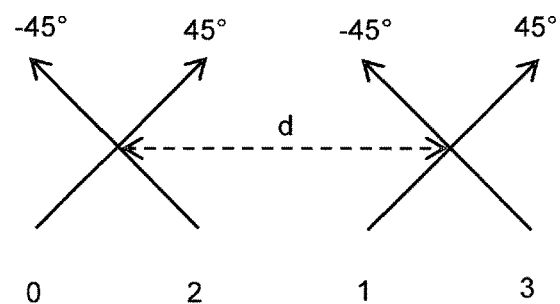

As an example of the present teaching, FIG. 2a schematically illustrates a commonly used antenna configuration for an LTE eNodeB configured with four antennas. The configuration includes closely spaced cross-polarized physical antennas; here numbered 0, 1, 2 and 3. Antennas 0, 1, 2, and 3, are commonly also referred to as antenna branches, or simply branches 0, 1, 2, and 3, respectively.

Figure 2B:
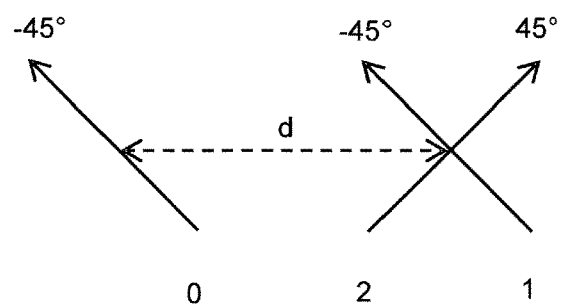

According to the present teaching, when one physical antenna fails, as illustrated in FIG. 2b, the multi-antenna radio access node acts in order to improve downlink performance by re-mapping logical antenna ports to the remaining working physical antennas.

Now, with reference to FIGS. 2a and 2b, consider an LTE system using a four-antenna port transmit diversity scheme such as TM2. The transmit diversity scheme uses two main branches for transmission of main signals, and two diversity branches for transmission of diversity signals. Branches 0 and 1 shown in FIG. 2a are main branches and branches 2 and 3 shown in FIG. 2a are diversity branches. In case one physical antenna fails, if no action is taken and the system continues to use three remaining working antennas with four-antenna port transmit diversity precoding, half of the symbols lose the diversity or main branch signal, i.e., only use a single antenna transmit scheme, which is not preferred since performance is reduced due to the loss in SNR.

Instead, according to the present teaching, when one antenna fails, e.g., antenna 0 in FIG. 2a, the association between logical antenna ports and physical antennas are re-mapped. The two co-polarized, still working branches, i.e., physical antenna 2 and 3 in FIG. 2a, are re-numbered as branches 0 and 1 in FIG. 2b, and the remaining cross-polarized branch is re-numbered as branch 2 in FIG. 2b. Thus, main signals will be transmitted from new physical antenna 0 and from new physical antenna 1. The diversity signals previously transmitted on branches 2 and 3 will now be remapped to a joint transmission from new branch 2, as will be exemplified below in connection to FIGS. 3a and 3b.

Figure 3A:
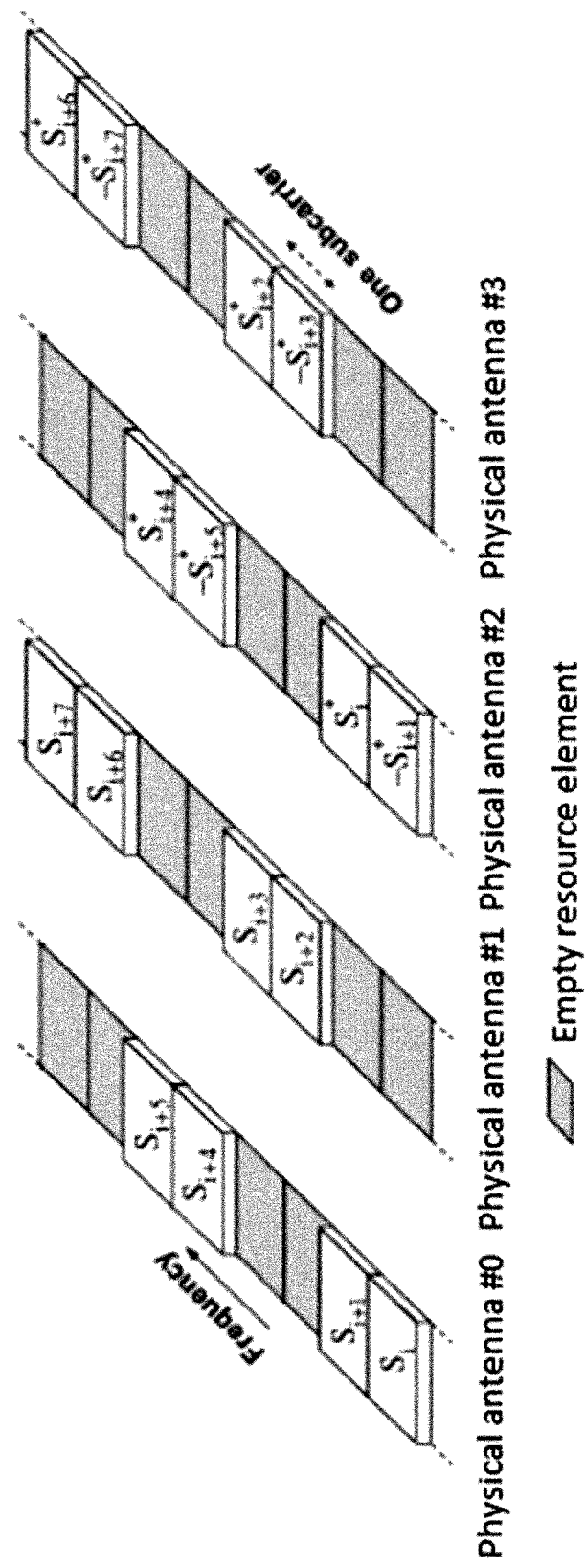
Figure 3B:
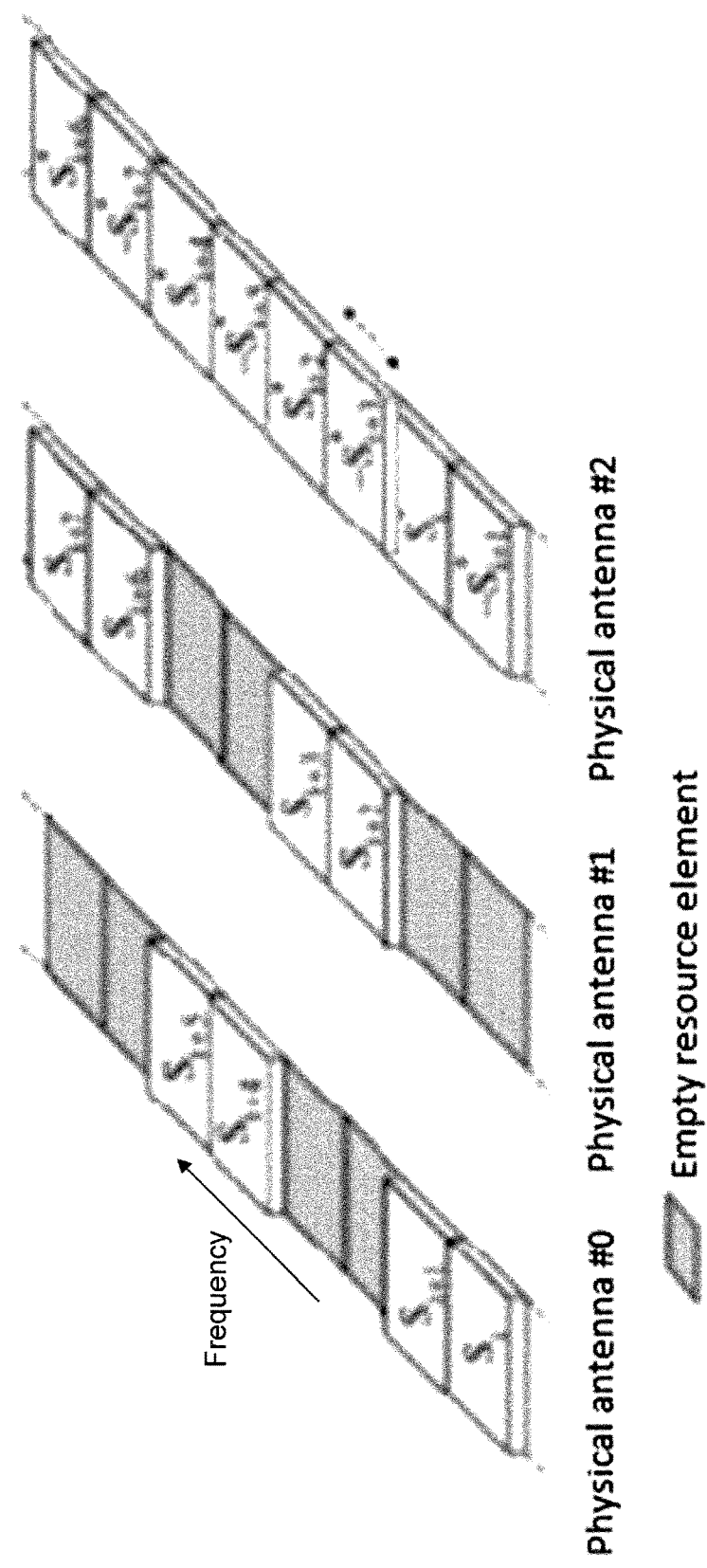

FIGS. 3a and 3b illustrate resource mappings of channels which use transmit diversity corresponding to antenna setups shown in FIG. 2a and FIG. 2b. Thus, the re-ordering of antennas and re-mapping of logical antenna port signals according to the current example is further clarified in FIGS. 3a and 3b, where transmitted signals from the different branches are illustrated as function of antenna port and subcarrier, i.e., physical antenna and frequency.

FIG. 3a shows the situation of a transmit diversity scheme such as TM2 prior to antenna failure and re-mapping. Logical antenna ports are one-to-one mapped to physical antennas, i.e., logical antenna port 0 is mapped to physical antenna 0, logical antenna port 1 is mapped to physical antenna 1, etc. Physical antennas, i.e., branches, 0 and 1 are used for main signal transmission, while antennas 2 and 3 are used for diversity signal transmission.

According to an aspect, transmit diversity is obtained by use of a space time block code, such as Alamouti code. Thus, in FIGS. 3a and 3b, complex symbols are shown to be transmitted via the different antennas. On some antennas, i.e., antenna 0 and antenna 1, the actual complex symbols, $S_i, S_{i+1}, \ldots$, are transmitted; these are the main signals. On other antenna, i.e., antennas 2 and 3, offset complex conjugates of the same symbols are transmitted, i.e., $-S_{i+}^*$, $S_i, \ldots$, according to the Alamouti space time block code; these are the diversity signals.

FIG. 3b shows the situation after antenna failure and re-mapping of signals. In FIG. 3b, main signals are still transmitted from branches 0 and 1, just like in FIG. 3a, although these branches are now corresponding to different physical antennas. However, the diversity signals previously transmitted on branches 2 and 3 in FIG. 3a are now both transmitted from the remaining branch 2. Thus, reordering and re-mapping according to the present teaching results in maintained transmit diversity, which is an advantage.

LTE makes use of so-called cell-specific reference signals in order to facilitate, e.g., cell search and initial acquisition, downlink channel estimation for coherent demodulation and detection at the UE, and downlink channel quality measurements. These cell-specific reference signals are transmitted via each of the four antenna ports.

A re-mapping between logical antenna ports and physical antennas will necessarily affect the cell-specific reference signals. With reference to the example described in connection to FIGS. 2a and 2b, the cell-specific reference signals previously transmitted from physical antennas 2 and 3, i.e., before the antenna failure, is after the re-mapping jointly transmitted from new physical antenna 2. However, in order to maintain the relative power between reference signals and, e.g., PDSCH symbols, the power of reference signals transmitted on branch 2 in FIG. 2b shall be reduced by half, while the power of reference signals transmitted from new branches 0 and 1 shall remain the same.

Cell-specific reference signal receive power, RSRP, measures average receive power of resource elements, RE, that carry cell specific reference signals. The RSRP perceived by a UE shall according to the present teaching remain the same after re-mapping, since a UE only uses reference signals transmitted from new branches 0 and 1 for RSRP estimation. Thus, the cell coverage in terms of handover borders shall, according to the present teaching, not change substantially, which is an advantage.

The re-mapping of bindings between logical antenna ports and physical antennas, and also the re-ordering of antenna branches is, according to different aspects of the present teaching, implemented by different modules of the multi-antenna radio access node, with substantially the same obtained technical effect.

According to a first aspect, the mapping between logical antenna ports and physical antennas is performed at baseband, for example by processing complex baseband signals.

According to a second aspect, the mapping between logical antenna ports and physical antennas is performed at an intermediate frequency, or at radio frequency, prior to transmission from physical antennas, for example by splitting and combining analog signals originating from the different logical antenna ports prior to transmission via the physical antennas.

Examples of these two implementation aspects will now be described in connection to FIG. 4a and FIG. 4b. It is, however, noted that all mappings, re-mappings, and reorderings of physical antennas described herein, regardless of where said mapping, re-mappings, and reordering, is performed, can be described by a matrix, as will be further detailed below.

Figure 4A:
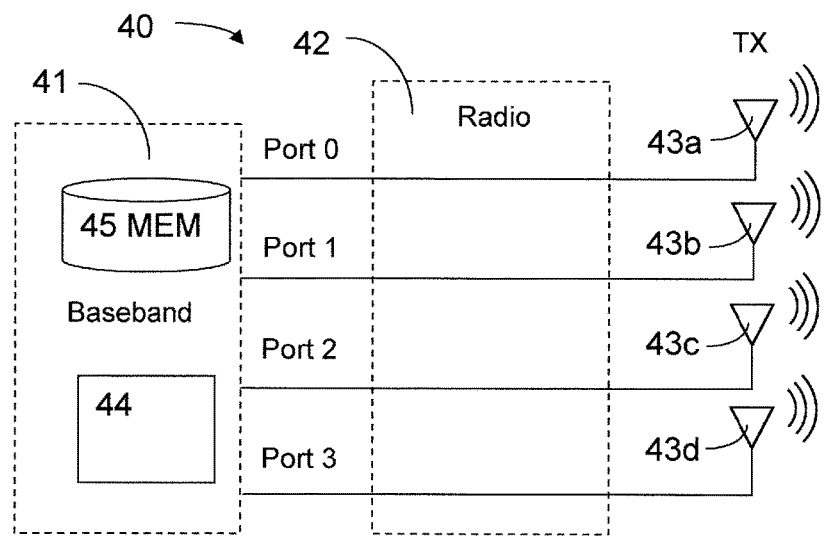
Figure 4B:
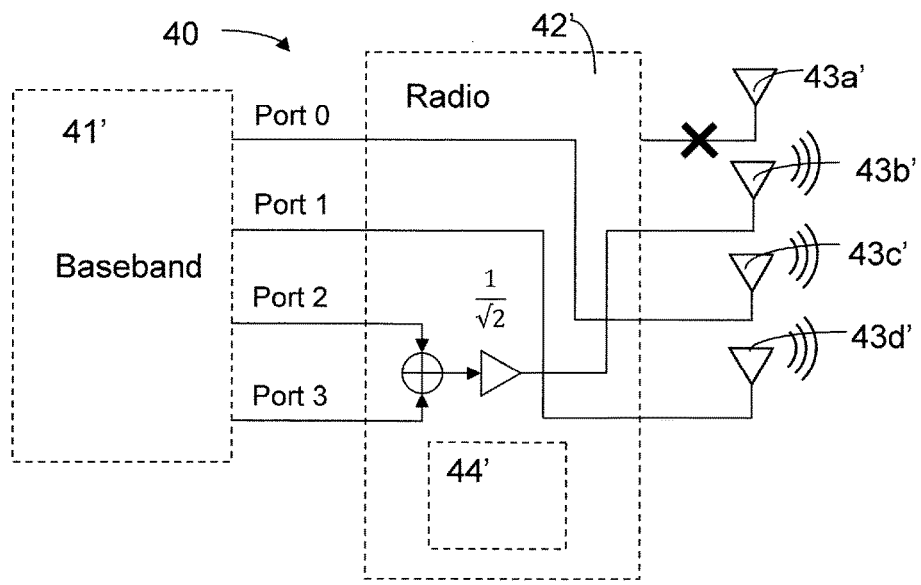

FIGS. 4a and 4b are schematic views of embodiments of a multi-antenna radio access node 40, illustrating mapping and re-mapping in a radio communications interface 42 between logical antenna ports and physical antennas. The illustrated multi-antenna radio access nodes 40 comprises four logical antenna ports, Port 0-3, and four physical antennas 43a-d, configured for enabling downlink data transmission over a reduced number of physical antennas.

A physical antenna is a single physical antenna, an antenna pair, a plurality of physical antenna elements or any other foreseeable physical implementation of an antenna. The multi-antenna radio access node 40 further comprises a radio communications interface 42 connecting to the four physical antennas and a processor 41 comprising the four logical antenna ports Port 0-3.

The processor 41 shown in FIG. 4a is configured to determine loss of data transmission from one physical antenna of the four physical antennas and to determine a required multi-antenna transmission scheme.

Thus, in accordance with an aspect of the disclosure, the multi-antenna radio access node 40 further includes a physical antenna failure determination entity 44.

The processor 41, 41' is further configured to select an antenna mapping matrix pre-stored in a memory 45 in the radio access node 40, the selected antenna mapping matrix being adapted to the required multi-antenna transmission scheme. In case of antenna failure, the processor 41 shown in FIG. 4a controls re-mapping of data on the four logical antenna ports, to the remaining three physical antennas 43b-d by using the selected antenna mapping matrix. The processor then initiates transmission of data from the remaining three physical antennas over the radio communication interface 42.

According to an aspect, the radio communications interface 42' shown in FIG. 4b is further configured to determine loss of data transmission from one physical antenna of the four physical antennas, by a comprised physical antenna failure determination entity 44', and to independently or in collaboration with the processor 41' determine a required multi-antenna transmission scheme. The processor 41' and/ or the radio communications interface 42' is further configured to select a pre-stored antenna mapping matrix, the selected antenna mapping matrix being adapted to the required multi-antenna transmission scheme. In case of antenna failure, the radio communications interface 42' shown in FIG. 4b controls re-mapping of data on the four logical antenna ports, Port 0-3, to remaining three physical antennas 43b-d, by using the selected antenna mapping matrix. The processor 41' then initiates transmission of data from the remaining three physical antennas over the radio communication interface 42'.

Control of the mapping and above mentioned power scaling between logical antenna ports and physical antennas is in FIG. 4a mainly controlled by the processor 41, while in FIG. 4b the radio communications interface 42 takes a more active part in the mapping between logical antenna ports and physical antennas, and also, as illustrated in FIG. 4b, in said power scaling. However, as previously noted, the obtained technical effect remains substantially the same.

Thus, according to one aspect, the processor 41 is configured to execute the re-mapping, and according to another aspect, the radio communications interface 42' is configured to execute the re-mapping.

As mentioned above, a node with four antennas used in LTE can be configured to use both transmit diversity or spatial multiplexing, depending on the transmission mode. Below are disclosed mapping matrices for various transmission modes for use in associating, or binding, logical antenna ports to physical antennas following loss of one out of four physical antennas, the loss being due to either failure of the physical antenna, or disconnection of one antenna for other reasons.

With regards to transmission modes using transmit diversity, the following downlink physical channels shall use a transmit diversity scheme in case 4 antenna ports are available: the Physical Broadcast Channel, PBCH, the Physical Control Format Indicator Channel, PCFICH, the Physical Downlink Control Channel, PDCCH, the Physical Hybrid ARQ Indicator Channel, PHICH, and the Physical Downlink Shared Channel using TM2 or TM3 rank 1 for transmission.

As already discussed above in connection to FIGS. 2a and 2b, in a four-antenna port transmit diversity scheme, antenna branches 0 and 1 are main branches and antenna branches 2 and 3 are diversity branches for antenna branches 0 and 1, respectively. In case one antenna fails, according to the present teaching, antenna branch 2 is used as diversity branch for both antenna branches 0 and 1, i.e., the antenna branch 2 shall use two logical antenna port transmit diversity precoding, as was illustrated in FIG. 3b, and also discussed in connection to FIG. 3b.

To describe the re-mapping from logical antenna ports to physical antennas, a transform matrix T is defined. The disclosed transform matrix represents one example of a mapping matrix, but other mappings are also within the scope of the disclosure.

$$T = \begin{bmatrix} T_0 & 0 & 0 & 0 \\ 0 & T_0 & 0 & 0 \\ 0 & 0 & T_0 & 0 \\ 0 & 0 & 0 & T_0 \end{bmatrix}$$

Where $T_0$ is a 3×4 matrix given by $$T_0 = \begin{bmatrix} 1 & 0 & 0 & 0 \\ 0 & 1 & 0 & 0 \\ 0 & 0 & K & K \end{bmatrix}$$

and K=1/√2 is the power scaling factor discussed above, i.e., a power scaling factor used in order to keep the transmit power of antenna branch 2 unchanged.

Now, to obtain a suitable re-mapping matrix for use with only three working physical antennas, T is multiplied from left by a suitable precoding matrix. One such suitable precoding matrix for use by PBCH, PCFICH and PDCCH in transmit diversity mode is the precoding matrix defined in Section 6.3.4.3 of 3GPP TS 36.211, "Evolved Universal Terrestrial Radio Access (E-UTRA); Physical channels and modulation". Using this precoding matrix we obtain a transmit diversity precoding matrix for PBCH, PCFICH and PDCCH using three antenna ports as $$\begin{bmatrix} y^{(0)}(4i) \\ y^{(1)}(4i) \\ y^{(2)}(4i) \\ y^{(0)}(4i+1) \\ y^{(1)}(4i+1) \\ y^{(2)}(4i+1) \\ y^{(0)}(4i+2) \\ y^{(1)}(4i+2) \\ y^{(2)}(4i+2) \\ y^{(0)}(4i+3) \\ y^{(1)}(4i+3) \\ y^{(2)}(4i+3) \end{bmatrix} =$$

$$\frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -K & 0 & 0 & 0 & jK & 0 & 0 \\ 0 & 1 & 0 & 0 & 0 & j & 0 & 0 \\ 0 & 0 & 0 & 0 & 0 & 0 & 0 & 0 \\ K & 0 & 0 & 0 & -jK & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & -K & 0 & 0 & 0 & jK \\ 0 & 0 & 0 & 0 & 0 & 0 & 0 & 0 \\ 0 & 0 & 0 & 1 & 0 & 0 & 0 & j \\ 0 & 0 & K & 0 & 0 & 0 & -jK & 0 \end{bmatrix} \begin{bmatrix} \mathrm{Re}(x^{(0)}(i)) \\ \mathrm{Re}(x^{(1)}(i)) \\ \mathrm{Re}(x^{(2)}(i)) \\ \mathrm{Re}(x^{(3)}(i)) \\ \mathrm{Im}(x^{(0)}(i)) \\ \mathrm{Im}(x^{(1)}(i)) \\ \mathrm{Im}(x^{(2)}(i)) \\ \mathrm{Im}(x^{(3)}(i)) \end{bmatrix}$$

for $$i = 0, 1, \ldots, M_{symb}^{layer} - 1$$

with $$M_{symb}^{ap} = \begin{cases} 4M_{symb}^{layer} & \text{if } M_{symb}^{(0)} \bmod 4 = 0 \\ (4M_{symb}^{layer}) - 2 & \text{if } M_{symb}^{(0)} \bmod 4 \neq 0, \end{cases}$$

where K=1/√2 is a power scaling factor to keep the power of antenna branches unchanged, i denotes subcarrier, $x^{(i)}$ denotes complex input signal to a logical antenna port i, and $y^{(q)}$ denotes the output signal of the q-th physical antenna.

The PHICH transmission on four antenna ports uses two transmit diversity precoders which are defined in section 6.9.2 of 3GPP TS 36.211, "Evolved Universal Terrestrial Radio Access (E-UTRA); Physical channels and modulation". The precoding matrices for PHICH using three antenna ports can be achieved in the same way as described above, by left multiplying T with the two transmit diversity precoders defined in section 6.9.2 of 3GPP TS 36.211, "Evolved Universal Terrestrial Radio Access (E-UTRA); Physical channels and modulation".

As noted above, multiple antennas can also be used to perform spatial multiplexing, i.e., MIMO.

For PDSCH transmission using four antenna ports in TM4, i.e., CLSM, the precoding matrix W shall preferably be selected from Table 6.3.4.2.3-2 of 3GPP TS 36.211, "Evolved Universal Terrestrial Radio Access (E-UTRA); Physical channels and modulation". The precoding operation can be expressed as $$\begin{bmatrix} y^{(0)} \\ \vdots \\ y^{(P-1)} \end{bmatrix} = W \begin{bmatrix} x^{(0)} \\ \vdots \\ x^{(\upsilon-1)} \end{bmatrix}$$

where the precoding matrix $$W = \begin{bmatrix} w_0 \\ w_1 \\ w_2 \\ w_3 \end{bmatrix}$$

is of size 4×ν, P=4 is the number of transmit antennas and ν is the number of layers. In case of failure of one antenna, the PDSCH channel will, according to the present teaching, use the three remaining working antennas for transmission, and the PDSCH precoding shall then, according to the present teaching, be performed as $$\begin{bmatrix} y^{(0)} \\ \vdots \\ y^{(P-2)} \end{bmatrix} = W' \begin{bmatrix} x^{(0)} \\ \vdots \\ x^{(v-1)} \end{bmatrix},$$

where W' is defined from W as $$W' = \begin{bmatrix} w_0 \\ w_1 \\ (w_2 + w_3)/2 \end{bmatrix}.$$

Further, LTE TM3 rank 2 to 4 transmission schemes uses large delay cyclic delay diversity, CDD, transmission schemes for PDSCH defined by $$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} = V(i) \begin{bmatrix} x^{(0)}(i) \\ \vdots \\ x^{(v-1)}(i) \end{bmatrix}.$$

where the precoding matrix $$V(i) = \begin{bmatrix} v_0(i) \\ v_1(i) \\ v_2(i) \\ v_3(i) \end{bmatrix}$$

is of size 4×v, P=4 is the number of transmit antennas and v is the number of layers. Similar to the treatment for TM4, in case of one antenna failure, the PDSCH precoding for TM3 rank 2 to 4 transmissions shall, according to aspects of the present teaching, be performed as $$\begin{bmatrix} y^{(0)}(i) \\ y^{(1)}(i) \\ y^{(2)}(i) \end{bmatrix} = V'(i) \begin{bmatrix} x^{(0)}(i) \\ \vdots \\ x^{(v-1)}(i) \end{bmatrix},$$

where the matrix V'(i) is obtained from V as, $$V'(i) = \begin{bmatrix} v_0(i) \\ v_1(i) \\ (v_2(i) + v_3(i))/2 \end{bmatrix}.$$

On another note, LTE also defines a primary synchronization signal, PSS, a secondary synchronization signal, SSS, and a positioning reference signal, PRS. The transmissions of these signals are also affected by the re-mapping of the present teaching.

The primary synchronization signal, PSS, secondary synchronization signal, SSS, positioning reference signals, PRS and MBSFN reference signals, MBSFN RS, are specified as using single antenna transmission scheme in 3GPP TS 36.211, "Evolved Universal Terrestrial Radio Access (E-UTRA); Physical channels and modulation". The mapping of PSS/SSS/PRS/MBSFN RS signals to multi-antennas is vendor specific. Denote the vendor specific precoding matrix used for PSS/SSS/PRS/MBSFN RS transmission on the four antenna ports as:

$$Z = \begin{bmatrix} z_0 \\ z_1 \\ z_2 \\ z_3 \end{bmatrix}.$$

In case of one antenna failure, these signals shall be transmitted via the three remaining antennas by using the precoding matrix Z', given by $$Z' = \begin{bmatrix} z_0 \\ z_1 \\ (z_2 + z_3)/2 \end{bmatrix},$$

where $z_0$-$z_3$ are taken from matrix Z above.

Figure 5:
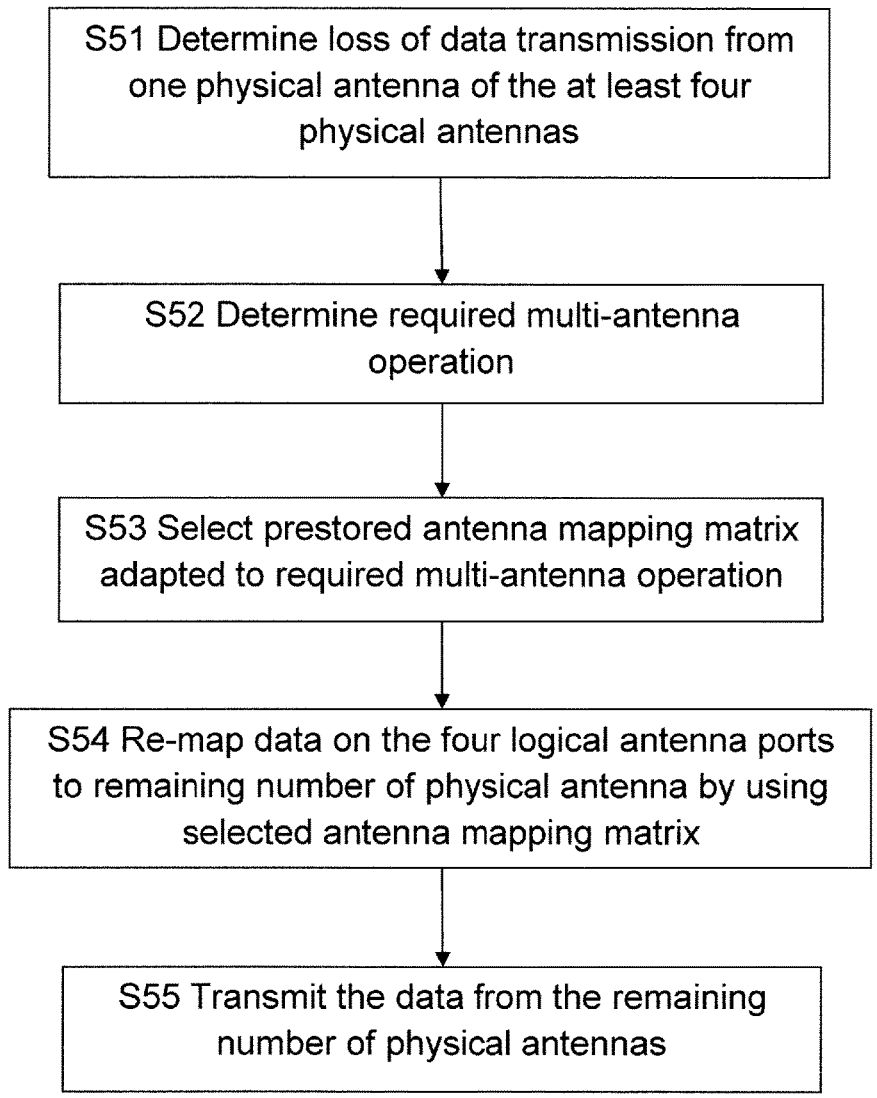
FIG. 5 is a flowchart illustrating embodiments of method steps performed in a multi-antenna radio access node It should be added that the following description of the embodiments is for illustration purposes only and should not be interpreted as limiting the disclosure exclusively to these embodiments/aspects.

FIG. 5 is a flowchart illustrating embodiments of method steps performed in a multi-antenna radio access node of transmitting data using a reduced number of physical antennas according to the present teaching. The first aspect in relation to transmitting data using a reduced number of physical antennas is a determination step wherein loss of data transmission from one physical antenna out of four physical antennas is determined in step S51. Loss of data transmission is either the result of a failure of the physical antenna or a voluntary disconnection of the physical antenna. The method is equally applicable for either situation.

In a next step S52, a required multi-antenna transmission scheme is determined. Examples of such multi-antenna transmission schemes include, but are not limited, to transmit diversity schemes such as LTE TM 2, and spatial multiplexing schemes such as LTE TM 3-4.

Based on the determined multi-antenna transmission scheme used for the downlink transmission by the radio access node, an antenna mapping matrix pre-stored in the radio access node is selected S53. The antenna mapping matrix is adapted to the required multi-antenna transmission scheme.

The disclosed antenna mapping matrices are used in the step S54 of re-mapping data on the four logical antenna ports to a remaining number of physical antennas by using the selected antenna mapping matrix. Following the re-mapping, data is transmitted, in step S55, from the remaining three physical antennas.

Consequently, a node implementing the present teaching will optimize, or at least improve, the system performance in case one antenna fails in a LTE eNodeB configured with four antenna ports.

A node implementing the present teaching will also provide better downlink transmit diversity and cell transmit power utilization.

The proposed method is applicable for LTE TM2, i.e., transmit diversity, TM3, i.e., OLSM, and TM4, i.e., CLSM.

In other words, the disclosure relates to a method, performed in a multi-antenna radio access node comprising four logical antenna ports mapped to corresponding physical antennas, of transmitting data using three physical antennas. The method comprises the step S51 of determining loss of data transmission from one physical antenna of the four physical antennas. The method also comprises a step S52 of determining a required multi-antenna transmission scheme. A step S53 comprises selecting an antenna mapping matrix prestored in the radio access node, the selected antenna mapping matrix adapted to the required multi-antenna transmission scheme. In further step S54 comprises re-mapping data on the four logical antenna ports to the remaining three physical antennas by using the selected antenna mapping matrix. Step S55 comprises transmitting the data from the remaining three physical antennas.

In accordance with an aspect of the disclosure, the loss of data transmission from one physical antenna results from an antenna failure.

As previously exemplified in the disclosure of example matrices, the re-mapping is performed in the baseband/logical interface of the multi-antenna radio access node or in the radio/physical interface of the multi-antenna radio access node.

The method further includes transmitting a set of reference signals, each reference signal representing a respective antenna port of the four logical antenna ports, on the remaining three physical antennas. Transmission power is scaled for each physical antenna based on the number of reference signals transmitted on the respective physical antenna.

In accordance with an aspect, the transmission power is reduced by half, when two reference signals are transmitted from one physical antenna or the transmission power of a physical antenna is scaled by a power scaling factor corresponding to the number of reference signals transmitted on the physical antenna.

In accordance with an aspect of the disclosure, re-mapping of the at least four logical antenna ports to a remaining three physical antennas comprises the use of a precoding matrix including the power scaling factor.

The scaling of the transmission power provides the advantage that transmission powers of remaining antenna branches are left unaffected by the re-mapping of the at least four logical antenna ports to a remaining three physical antennas.

In accordance with an aspect of the disclosure, the re-mapping implies re-mapping of a first logical antenna port Port 0 to a first physical antenna 43*c*', a second logical antenna port Port 1 to a second physical antenna 43*d*' and a third and fourth logical antenna port Port 2 and 3 to a third physical antenna 43*b*', wherein the first and second physical antennas are co-polarized antennas and the third physical antenna element has an orthogonal polarization to the first and second physical antennas.

In accordance with an aspect of the disclosure, determination of the required multi-antenna transmission scheme comprises determining one or more types of antenna transmission schemes used in current transmission and selecting a re-mapping matrix from a group of prestored re-mapping matrices based on current antenna transmission scheme, each re-mapping matrix representing a re-mapping adapted to a specified antenna transmission scheme.

In accordance with an aspect of the disclosure, the method further comprises using an antenna transmission scheme with a transmit diversity scheme for the PBCH, Physical Broadcast Channel; PCFICH, Physical Control Format Indicator Channel; PDCCH, Physical Downlink Control Channel; PHICH, Physical Hybrid ARQ Indicator Channel; and/or PDSCH, Physical Downlink Shared Channel: In the transmit diversity scheme, a first and second physical antenna represent main branches and a third physical antenna represents a diversity branch. The power of transmissions on the third physical antenna element is scaled by a power scaling factor.

In accordance with an aspect of the disclosure, the power scaling factor is selected to align transmission power on the diversity branch to transmission power on the main branches.

The disclosure also relates to a multi-antenna radio access node 40, 40' in a wireless network. The multi-antenna radio access node 40, 40' comprises four logical antenna ports Port 0-3 and four physical antennas 43*a-d*, 43*a'*-43*d'*. The disclosed multi-antenna radio access node is configured for enabling downlink data transmission over a reduced number of physical antennas 43*b-d*, 43*b'*-d'. The multi-antenna radio access node further comprises a radio communications interface connecting to the four physical antennas. A processor 41, 41' of the multi-antenna radio access node comprises the four logical antenna ports and is configured to determine loss of data transmission from one physical antenna of the four physical antennas and to determine required multi-antenna transmission scheme. The processor 41, 41' is further configured to select an antenna mapping matrix prestored in a memory 45 in the radio access node, the selected antenna mapping matrix adapted to the required multi-antenna transmission scheme. The processor 40, 40' is configured to control the re-mapping of data on the four logical antenna ports to remaining three physical antennas by using the selected antenna mapping matrix and to initiate transmission of data from the remaining three physical antennas over the radio communication interface 42, 42'.

In accordance with an aspect of the disclosure, the multi-antenna radio access node further includes a physical antenna failure determination entity 44, 44'.

In accordance with an aspect of the disclosure, the processor 40 is configured to execute the re-mapping.

In accordance with another aspect of the disclosure, the radio communications interface 42' is configured to execute the re-mapping.

The disclosure also relates to a computer program, comprising computer readable code which, when run in a multi-antenna radio access node causes the access node to perform the disclosed method.

The invention claimed is:

1. A method, performed in a multi-antenna radio access node comprising four logical antenna ports mapped to corresponding physical antennas, of transmitting data using three physical antennas, the method comprising:
   determining loss of data transmission from one physical antenna of the four physical antennas;
   determining a required multi-antenna transmission scheme;
   selecting an antenna mapping matrix prestored in the radio access node, the selected antenna mapping matrix adapted to the required multi-antenna transmission scheme;
   remapping data on the four logical antenna ports to the remaining three physical antennas by using the selected antenna mapping matrix;
   transmitting the data from the remaining three physical antennas;
   transmitting a set of reference signals on the remaining three physical antennas, each reference signal representing a respective antenna port of the four logical antenna ports; and scaling transmission power for each physical antenna based on the number of reference signals transmitted on the respective physical antenna.

2. The method of claim 1, wherein the loss of data transmission from one physical antenna results from an antenna failure.

3. The method of claim 1, wherein the remapping is performed in a baseband/logical interface of the multi-antenna radio access node.

4. The method of claim 1, wherein the remapping is performed in a radio/physical interface of the multi-antenna radio access node.

5. The method of claim 1, wherein the transmission power is reduced by half, when two reference signals are transmitted from one physical antenna.

6. The method of claim 1, further including remapping the at least four logical antenna ports to a remaining three physical antennas using a precoding matrix including a power scaling factor corresponding to the number of reference signals transmitted on a physical antenna.

7. The method of claim 1:
wherein the remapping comprise remapping of a first logical antenna port to a first physical antenna, a second logical antenna port to a second physical antenna, and a third and fourth logical antenna port to a third physical antenna;
wherein the first and second physical antennas are co-polarized antennas and the third physical antenna element has an orthogonal polarization to the first and second physical antennas.

8. The method of claim 1, wherein the determining the required multi-antenna transmission scheme comprises:
determining one or more types of antenna transmission scheme used in current transmission; and
selecting a remapping matrix from a group of prestored remapping matrices based on current antenna transmission scheme, each remapping matrix representing a remapping adapted to a specified antenna transmission scheme.

9. The method of claim 1:
further comprising using an antenna transmission scheme with a transmit diversity scheme for at least one of: a Physical Broadcast Channel; a Physical Control Format Indicator Channel; a Physical Downlink Control Channel; a Physical Hybrid ARQ Indicator Channel; and a Physical Downlink Shared Channel;
wherein a first and second physical antenna represent main branches in the transmit diversity scheme and a third physical antenna represents a diversity branch; and
wherein power of transmissions on the third physical antenna element is scaled by a power scaling factor.

10. The method of claim 9, wherein the power scaling factor is selected to align transmission power on the diversity branch to transmission power on the main branches.

11. A multi-antenna radio access node in a wireless network, the radio access node configured for enabling downlink data transmission over a reduced number of physical antennas, the radio access node comprising:
four logical antenna ports and four physical antennas;
a radio communications interface connecting to the four physical antennas;
a memory;
a processor comprising the four logical antenna ports and configured to:
determine loss of data transmission from one physical antenna of the four physical antennas;
determine a required multi-antenna transmission scheme;
select an antenna mapping matrix prestored in the memory, the selected antenna mapping matrix adapted to the required multi-antenna transmission scheme;
control remapping of data on the four logical antenna ports to remaining three physical antennas by using the selected antenna mapping matrix; and
initiate transmission of data from the remaining three physical antennas over the radio communication interface;
initiate transmission of a set of reference signals on the remaining three physical antennas, each reference signal representing a respective antenna port of the four logical antenna ports; and
scale transmission power for each physical antenna based on the number of reference signals transmitted on the respective physical antenna.

12. The multi-antenna radio access node of claim 11, further comprising a physical antenna failure determination entity.

13. The multi-antenna radio access node of claim 11, wherein the processor is configured to execute the remapping.

14. The multi-antenna radio access node of claim 11, wherein the radio communications interface is configured to execute the remapping.

15. A computer program product stored in a non-transitory computer readable medium for controlling a multi-antenna radio access node comprising four logical antenna ports mapped to corresponding physical antennas so as to transmit data using three physical antennas, the computer program product comprising software instructions which, when run on a processor of the access node, causes the access node to:
determine loss of data transmission from one physical antenna of the four physical antennas;
determine a required multi-antenna transmission scheme;
select an antenna mapping matrix prestored in the radio access node, the selected antenna mapping matrix adapted to the required multi-antenna transmission scheme;
remap data on the four logical antenna ports to the remaining three physical antennas by using the selected antenna mapping matrix;
transmit the data from the remaining three physical antennas;
transmit a set of reference signals on the remaining three physical antennas, each reference signal representing a respective antenna port of the four logical antenna ports; and
scale transmission power for each physical antenna based on the number of reference signals transmitted on the respective physical antenna.

* * * * *